United States Patent
Du et al.

(10) Patent No.: US 12,511,049 B2
(45) Date of Patent: Dec. 30, 2025

(54) SSD DEVICE ACCELERATED BY DYNAMIC CAPACITY CACHE

(71) Applicant: INNOGRIT TECHNOLOGIES CO., LTD., Shanghai (CN)

(72) Inventors: Song Du, Shanghai (CN); Zining Wu, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 39 days.

(21) Appl. No.: 18/428,808

(22) Filed: Jan. 31, 2024

(65) Prior Publication Data

US 2024/0264747 A1 Aug. 8, 2024

(30) Foreign Application Priority Data

Feb. 3, 2023 (CN) .......................... 202310095418.4

(51) Int. Cl.
*G06F 3/06* (2006.01)
(52) U.S. Cl.
CPC ............ *G06F 3/0611* (2013.01); *G06F 3/064* (2013.01); *G06F 3/0679* (2013.01)
(58) Field of Classification Search
CPC ...... G06F 3/0611; G06F 3/064; G06F 3/0679; G06F 3/0608; G06F 3/0629; G06F 3/0673; Y02D 10/00

USPC ........................................................ 711/154
See application file for complete search history.

(56) References Cited

U.S. PATENT DOCUMENTS

| | | | |
|---|---|---|---|
| 2012/0198175 A1* | 8/2012 | Atkisson | G06F 12/0833 711/135 |
| 2018/0165698 A1* | 6/2018 | Chandrashekar | G06Q 30/0206 |

* cited by examiner

*Primary Examiner* — Hua J Song
(74) *Attorney, Agent, or Firm* — HSML P. C.

(57) ABSTRACT

The present application relates to the field of SSD and discloses an SSD device with dynamic capacity cache acceleration, comprising: a memory comprising multiple storage subspaces; a cache comprising multiple cache subspaces; a cache allocator configured to calculate a cache execution configuration based on a cache configuration request for the storage subspace; a cache executor which selects a traversal range and a traversal order based on a cache execution configuration, a structured data for traverse history and a virtual index of a storage unit, and calculates minimum and maximum cost thresholds, the traversal range includes a set of cache units in a corresponding cache subspace and is divided into a plurality of pending windows; traverses the pending windows in the traversal order, calculates a cost function for each cache unit in the current pending window based on a structured state table, and selects a cache unit with a cost function that is less than the minimum cost threshold. This application configures and changes the cache subspace without resetting the device.

10 Claims, 1 Drawing Sheet

SSD DEVICE ACCELERATED BY DYNAMIC CAPACITY CACHE

CROSS-REFERENCE TO PRIOR APPLICATION

This application claims priority to Chinese Application number CN 2023100954184 which is filed on Feb. 3, 2023, the contents of which are incorporated herein by reference.

TECHNICAL FIELD

This application involves the technology field of SSD, particularly an SSD device with dynamic capacity cache acceleration.

BACKGROUND

Storage devices (or SSDs) divide all storage units into several storage subspaces according to external requests. Existing storage devices provide high-speed read-write caching for the storage subspaces within the device. To accelerate the read-write bandwidth of the contents in the storage unit and reduce latency, a certain number of in-device cache units are allocated for a certain number of storage units. The number of storage units belonging to a storage subspace and the corresponding cache unit count are fixed or non-configurable at runtime. This means that, unless the device is reset (without the need for resetting the device), it is not possible to alter the number of corresponding cache units in response to the external requests, thereby changing the average cache hit rate for the storage subspace. Due to the limitation, a device that can dynamically allocate the capacity of storage subspaces based on the external requests at runtime cannot simultaneously provide an optional average cache hit rate for the storage subspaces.

On this basis, existing operating systems use system memory to provide high-speed read-write caching for the storage subspaces outside of the device. The operating system dynamically adjusts the relationship between the cache units and all accessed storage units within the device at runtime. Compared to adjustments of in-device caches, this method occupies additional computational and memory resources outside of the device. Moreover, it cannot configure varying numbers of cache units as per external requests without resetting the system.

This section aims to provide background or context for the implementation of the application set forth in the claims. The content of this section is provided for reference only and does not constitute an acknowledgment or admission that it is part of the prior art.

SUMMARY OF THE INVENTION

An object of this application is to provide an SSD device accelerated by dynamic capacity cache, which can configure and change the number of cache units to which the cache subspace belongs without resetting the device.

The application discloses an SSD device with dynamic capacity cache acceleration, comprising:

a memory comprising multiple storage subspaces;

a cache comprising multiple cache subspaces, each corresponding one-to-one with the storage subspaces;

a cache allocator, configured to: calculate a cache execution configuration for a storage subspace based on a cache configuration request for the storage subspace; and a cache executor, configured to: select a traversal range and a traversal order and calculate a minimum cost threshold and a maximum cost threshold based on the cache execution configuration of a corresponding cache subspace of a storage subspace to which a storage unit belongs, a structured data for traverse history, and a virtual index of the storage unit, the traversal range comprising a set of cache units within the corresponding cache subspace, the set of cache units being divided into a plurality of pending windows; traverse the plurality of pending windows according to the traversal order, calculate a cost function of each cache unit in current pending window according to a structured state table of the corresponding cache subspace, and select a cache unit with its cost function less than the minimum cost threshold, or select a cache unit with the smallest cost function and less than the maximum cost threshold after traversing the plurality of pending windows; and update the structured state table corresponding to the cache unit within the current pending window, and record the values of the cost functions of the traversed pending windows and the selected cache unit into the structured data for traverse history.

In one embodiment, the cache executor is configured to: if no cache unit is selected after traversing the plurality of pending windows, select the cache unit with the smallest cost function, and if the content of the cache unit is inconsistent with the content of its corresponding storage unit, write the content of the cache unit into the corresponding storage unit, recalculate the cost function of the cache unit, and record the cost function value of the cache unit into the structured data for traverse history if the cost function is less than the maximum cost threshold.

In one embodiment, the SSD device further comprises a metadata memory which stores:

structured metadata for the storage subspaces used to record metadata of each storage subspace, wherein each storage subspace comprises a plurality of areas of continuous storage blocks, each area of continuous storage blocks comprises a plurality of storage blocks with continuous device indexes, each storage block comprises a plurality of storage units, and each storage subspace has a corresponding virtual index space, wherein the metadata of each storage subspace comprises an index table for the continuous storage blocks, an virtual index table for the storage blocks, and a mapping table for the storage units; and structured metadata for the cache subspaces used to record metadata of each cache subspace, wherein each cache subspace comprises a plurality of areas of continuous cache blocks, each area of continuous cache blocks comprises a plurality of cache blocks with continuous device indexes, each cache block comprises a plurality of cache units, and each storage subspace has a corresponding virtual index space, wherein the metadata of each cache subspace comprises an index table for continuous cache blocks, an virtual index table for the cache blocks, a mapping table for the cache units, a structured state table for the cache units, a structured configuration, and structured data for traverse history, the structured configuration comprises a cache request configuration and a cache execution configuration, the cache request configuration comprises a cache capacity and a cache policy option, the cache execution configuration comprises a cache execution capacity configuration and a cache execution policy option, the cache execution capacity configuration comprises a minimum cache capacity, a necessary cache capacity, a read peak cache capacity, and a write peak cache capacity, the cache execution policy option comprise a configuration policy option, a traversal policy option and a drop policy option.

In one embodiment, the cache allocator is further configured to:

after calculating the cache execution configuration for the cache request configuration for a cache subspace corresponding to a storage subspace to be run and completing the configuration, traverse other cache subspaces, and group unallocated cache units into an area of continuous cache blocks and allocate it to a cache subspace based on the configuration policy option; and record the area of continuous cache blocks in the index table for continuous cache blocks, record the cache request configuration and the cache execution configuration in the structured configuration, initialize all table entries of the mapping table for the storage units of the storage subspace to be empty, initialize all table entries of the mapping table for the cache units of the cache subspace to be empty, and initialize the structured state table for the cache units of the cache subspace to be the initial state of structured state machines of respective units.

In one embodiment, the cache allocator is further configured to:

after calculating the cache execution configuration for the cache request configuration for a cache subspace corresponding to a storage subspace that is running and completing the configuration, notify the cache executor to suspend all actions in the storage subspace and its corresponding cache subspace;

traverse other cache subspaces, and group unallocated cache units into an area of continuous cache blocks and allocate it to a cache subspace based on the configuration policy option;

record the area of continuous cache blocks in the index table for continuous cache blocks, record the cache request configuration and the cache execution configuration in the structured configuration, initialize all table entries of the mapping table for the cache units of the cache subspace to which a newly allocated cache unit belongs to be empty, and initialize the structured state table for the cache units of the cache subspace to which the newly allocated cache unit belongs to be the initial state of the structured state machines of respective units; and notify the cache executor to resume all actions in the storage subspace and its corresponding cache subspace.

In one embodiment, the cache allocator is further configured to:

after calculating the cache execution configuration for the cache request configuration for a cache subspace corresponding to a storage subspace that is running and completing the configuration, notify the cache executor to suspend all actions in the storage subspace and its corresponding cache subspace;

notify the cache executor to write the contents of all cache units within the corresponding cache subspace, which are inconsistent with the contents of the corresponding storage units, into the corresponding storage units;

traverse all cache units in the index table for continuous cache blocks for the cache subspace, reduce several cache units according to the configuration policy option;

record the areas of continuous cache blocks that belong to the cache subspace after reduction in the index table for continuous cache blocks, record the cache request configuration and the cache execution configuration in the structured configuration, initialize all table entries of the mapping table for the storage units of the storage subspace to be empty, initialize all table entries of the mapping table for the cache units of the cache subspace to be empty, and initialize the structured state table for the cache units of the cache subspace to be the initial state of the structured state machines of respective units; and notify the cache executor to resume all actions in the storage subspace and its corresponding cache subspace.

In one embodiment, the cache executor is further configured to:

in response to a read request to a storage unit, calculate a virtual index of a cache unit corresponding to the storage unit based on a subspace index of a storage subspace to which the storage unit belongs and a virtual index of the storage unit in the storage subspace;

if the corresponding cache unit is found, check the structured state of the cache unit, and if the contents of the cache unit are valid, update the contents of the cache unit in the structured state table, respond to the read request with the contents of the cache unit and update the contents of the cache unit in the structured state table again; if the contents of the cache unit are invalid, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the storage unit into the cache unit, respond to the read request with the contents of the cache unit, and update the contents of the cache unit in the structured state table again; and if the corresponding cache unit is not found, traverse and select a cache unit in the cache subspace corresponding to the storage subspace to which the storage unit belongs, correspond the storage unit one-to-one with the cache unit, calculate the device index of the storage unit based on the subspace index of the storage subspace to which the storage unit belongs and the virtual index of the storage unit in the storage subspace, calculate the device index of the cache unit based on the subspace index of the cache unit and the virtual index of the cache unit in the storage subspace, update the contents of the cache unit in the structured state table, write the contents of the cache unit into the cache unit, and update the contents of the cache unit in the structured state table, write the contents of the storage unit into the cache unit, respond to the read request with the contents of the cache unit, and update the contents of the cache unit in the structured state table again.

In one embodiment, the cache executor is further configured to:

in response to a write request to a storage unit, calculate a virtual index of a cache unit corresponding to the storage unit based on a subspace index of a storage subspace to which the storage unit belongs and a virtual index of the storage unit in the storage subspace;

if the corresponding cache unit is found, check the structured state of the cache unit, and if the contents of the cache unit are valid and the size of the write request is consistent with the size of the storage unit, update the contents of the cache unit in the structured state table, respond to the write request with the contents of the cache unit, and update the contents of the cache unit in the structured state table again; if the contents of the cache unit are invalid and the size of the write request is inconsistent with the size of the storage unit, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the storage unit into the cache unit, respond to the write request with the contents of the cache unit, and update the contents of the cache unit in the structured state table again; and if the corresponding cache unit is not found, traverse and select a cache unit in the cache subspace corresponding to the storage subspace to which the storage unit belongs, correspond the storage unit one-to-one with the cache unit, if the size of the write request is inconsistent with the size of the storage unit, calculate the device index of the storage unit based on the subspace index of the storage subspace to which the storage unit belongs and the virtual index of the storage unit in the storage subspace, calculate the device index of the cache unit based on the subspace index of the cache unit and the virtual index of the cache unit in the cache subspace, update the contents of the cache unit in the structured state table, respond to the read request with the contents of the cache unit, and update the contents of the cache unit in the structured state table again; if the size of the write request is consistent with the size of the storage unit, update the contents of the cache unit in the structured state table, update the contents of the cache unit in the structured state table, respond to the write request with the contents of the cache unit, and update the contents of the cache unit in the structured state table again.

In one embodiment, the cache executor is further configured to:

in response to a request to write a cache unit into a corresponding storage unit, calculate a virtual index of a storage unit corresponding to the cache unit based on the subspace index of a cache subspace to which the cache unit belongs and a virtual index of the cache unit in the cache subspace;

traverse within the cache subspace based on the cache drop policy option of the cache subspace and the structured state of the cache unit, if a new cache unit different from the cache unit is found, set the new cache unit to be unmapped, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit and the new cache unit in the structured state table, write the contents of the cache unit into the new cache unit, update the contents of the cache unit and the new cache unit in the structured state table again, write the contents of the new cache unit into the storage unit, and update the contents of the cache unit and the new cache unit in the structured state table again; and if the corresponding cache unit is not found, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the cache unit into the storage unit, and update the contents of the cache unit in the structured state table again.

In one embodiment, the SSD device further comprises:

a cache configuration interface configured to receive an external cache configuration request including a cache capacity and a cache adjustment policy option;

an external read/write interface configured to respond to external read/write requests, read out all or part of the content of the corresponding storage unit or writing all or part of the content received by the external read/write interface into the corresponding storage unit; and an internal read/write interface configured to implement read and write between the cache units and the storage units.

In an embodiment of the application, an SSD device accelerated by dynamic capacity cache inside the device is provided, wherein the number of cache units corresponding to each storage subspace can be configured according to some options based on the external requests received by the device, without resetting the device. Furthermore, when the configuration is not changed, the actual number of cache units serving each subspace has no effect on each other.

This specification contains numerous technical features distributed among various technical solutions. Listing all possible combinations of these technical features (i.e., technical solutions) would make the specification too lengthy. To avoid this problem, the technical features disclosed in the above-mentioned invention content, the technical features disclosed in various embodiments and examples in the following text, and the technical features disclosed in the drawings can all be freely combined to form various new technical solutions (which should be considered as already disclosed in this specification), unless such combinations of technical features are technically infeasible. For example, if feature A+B+C is disclosed in one example and feature A+B+D+E is disclosed in another example, and features C and D are equivalent technical means that serve the same purpose, only one of them can be chosen for technical reasons and cannot be used simultaneously. Feature E can be combined with feature C from a technical perspective. Therefore, the A+B+C+D solution should not be considered as already disclosed because it is technically infeasible, while the A+B+C+E solution should be considered as already disclosed.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application clearer, embodiments of the present application will be further described in detail below with reference to the accompanying drawings.

Figure 1:
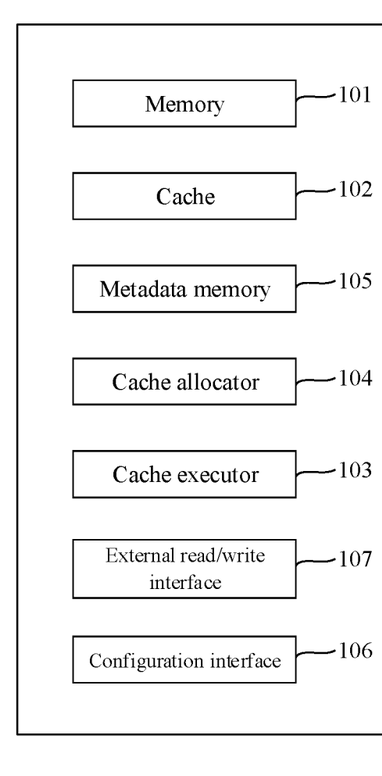
FIG. 1 is a schematic structural diagram of an SSD device with dynamic capacity cache acceleration according to an embodiment of the present application.

An embodiment of this application relates to an SSD device with dynamic capacity cache acceleration, the structure of which is shown in FIG. 1. The SSD device includes a memory 101, a cache 102, a cache executor 103, and a cache allocator 104. The memory 101 is configured to contain multiple storage subspaces. The cache 102 is configured to contain multiple cache subspaces, and there is one-to-one correspondence between the cache subspaces and the storage subspaces.

Specifically, all storage units in the SSD device are grouped into a plurality of storage blocks of the same size according to their device indexes. Each storage block has the same quantity of storage units in powers of 2 (2, or 4, or 8, or 16, ... ). The high bit string of each storage unit's device index is the device index within the storage block to which it belongs, and the low bit string is its relative index (Relative Index) within the storage block. There are several storage subspaces within an SSD device. Each storage subspace comprises a plurality of areas of continuous storage blocks, and each area of continuous storage blocks comprises a plurality of storage blocks with continuous device indexes. Each storage subspace has a virtual index space. Within the virtual index space, all blocks belonging to the storage subspace are indexed in descending order according to the virtual index. The high bit string of each storage unit's virtual index is the virtual index within the storage block to which it belongs, and the low bit string is its relative index (Relative Index) within the storage block.

All cache units in the SSD device are grouped into a plurality of cache blocks of the same size according to their device indexes. Each cache block has the same quantity of cache units in powers of 2 (2, or 4, or 8, or 16, ... ). The high bit string of each cache unit's device index is the device index within the cache block to which it belongs, and the low bit string is its relative index (Relative Index) within the cache block. There are several cache subspaces within the SSD device. Each cache subspace comprises a plurality of areas of continuous cache blocks, and each area of continuous cache blocks comprises a plurality of cache blocks with continuous device indexes. Each cache subspace has a virtual index space. Within the virtual index space, all blocks belonging to the cache subspace are indexed in descending order according to the virtual index. The high bit string of each cache unit's virtual index is the virtual index within the cache block to which it belongs, and the low bit string is its relative index (Relative Index) within the cache block. There are a fixed quantity of storage subspaces and a fixed quantity of cache subspaces within the device. Each storage subspace corresponds to a cache subspace and the correspondence is fixed. The index of the storage subspace within the device is equal to the index of the cache subspace within the device, referred to as the subspace index.

The capacity size of the storage unit is the same as the capacity size of the cache unit. If the storage unit is divided into smaller pages of the same size to the power of 2, the cache unit pages are also divided into pages of the same size, quantity and order. These storage pages correspond one-to-one with the cache pages. Their relative indexes in their respective units are consistent.

In one embodiment, the SSD device further includes a metadata memory 105, which stores:

1) structured metadata for the storage subspaces, which records a fixed amount of metadata for the storage subspaces. The metadata for the storage subspaces comprises:

1.1) index table for continuous blocks: the continuous blocks belonging to this subspace are arranged consecutively in a certain order. The index of this table is the serial number of the area of continuous blocks in this arrangement. The entries of this table contain the following data: the device index of the start block of this area of continuous blocks; the quantity of blocks in this area of continuous blocks.

1.2) virtual index table for the blocks: the continuous blocks belonging to this storage subspace are arranged consecutively in a certain order, which are arranged to group an ordered list of continuous blocks. The index of the table is the serial number of each block in this arrangement, and the value in the table is the device index of each block.

1.2) mapping table for the units: the index of this mapping table is the virtual indexes of all storage units within this storage subspace. The table entries of this mapping table contain the following: if there is no corresponding cache unit, it is recorded as empty table entry; if there is a corresponding cache unit, it is recorded as the virtual index of this cache unit within the cache subspace.

2) structured metadata for the cache subspaces, which records a fixed amount of metadata for the cache subspaces. The metadata for the cache subspaces comprises:

2.1) index table for continuous blocks: the continuous blocks belonging to this subspace are arranged consecutively in a certain order. The index of this table is the serial number of the area of continuous blocks in this arrangement. The entries of this table contain the following data: the device index of the start block of this area of continuous blocks; the quantity of blocks in this area of continuous blocks.

2.2) virtual index table for the blocks: the continuous blocks belonging to this subspace are arranged consecutively in a certain order, which are arranged to group an ordered list of continuous blocks. The index of the table is the serial number of each block in this arrangement, and the value in the table is the device index of each block.

2.3) mapping table for the units: the index of this mapping table is the virtual index of all cache units within this cache subspace. The table entries of this mapping table contain the following: if there is no corresponding storage unit, it is recorded as empty table entry; if there is a corresponding storage unit, it is recorded as the virtual index of this storage unit within the storage subspace.

2.4) structured state table for the units: the index of this table is the virtual index of all cache units within this cache subspace. The entry of this table contains structured state of the structured state machine for this cache unit. The structured state includes at least: whether the contents of this cache unit are valid; whether the contents of this cache unit are deterministically consistent with the contents of its corresponding storage unit, which includes whether smaller pages within this cache unit are deterministically consistent with the contents of the pages within the corresponding storage unit; history of read access for this cache unit; and history of write access for this cache unit.

2.5) structured configuration: including a cache request configuration and a cache execution configuration, the cache request configuration comprises a cache capacity and a cache policy option, the cache execution configuration comprises a cache execution capacity configuration and a cache execution policy option, the cache execution capacity configuration comprises a minimum cache capacity, a necessary cache capacity, a read peak cache capacity, and a write peak cache capacity, the cache execution policy option comprise a configuration policy option, a traversal policy option and a drop policy option.

2.6) structured data for traverse history.

The SSD device also includes a configuration interface 106 that connects inside and outside the SSD. The interface 106 responds to requests initiated by an external initiator to initiate requests to the cache allocator to configuring a cache subspace corresponding to a storage subspace, and feeds back configuration results it receives from the cache allocator. The configuration requests for the cache subspaces include the cache capacity and the cache adjustment policy option.

The SSD device also includes an internal read/write interface 107 that connects to an internal storage reader (not shown in the figure). The interface 107 writes the contents of a cache unit into a storage unit and feeds back the execution results, or reads out the contents of a storage unit to a cache unit and feeds back the execution results. The two units are addressed with their device indexes.

The cache allocator 104 may receive configuration requests from the configuration interface at runtime, calculate the cache execution configuration for the storage subspace, allocate the cache capacity for an empty cache subspace corresponding to the storage subspace that is to be run, increase the cache capacity for an existing cache subspace corresponding to the running storage subspace, and decrease the cache capacity for an existing cache subspace corresponding to the running storage subspace, in a system state in which the other storage subspaces and cache subspaces are running.

The cache executor 103 can sequentially execute a total sequence composed of the following action sequences:

(1) deriving the device index of a storage unit based on its storage subspace index, and its virtual index within the storage subspace.

(2) deriving the device index of a cache unit based on its cache subspace index, and its virtual index within the cache subspace.

(3) deriving the storage subspace to which a storage block belongs based on its device index.

(4) deriving the cache subspace to which a cache block belongs based on its device index.

(5) based on the subspace index of the storage subspace to which a storage unit belongs, and the virtual index of the storage unit within the storage subspace, deriving the virtual index of the storage unit's corresponding cache unit.

(6) based on the subspace index of the cache subspace to which a cache unit belongs, and the virtual index of the cache unit within the cache subspace, deriving the virtual index of the cache unit's corresponding storage unit.

(7) for a storage unit, traversing and selecting a cache unit for reading or writing within the cache subspace corresponding to the storage subspace to which it belongs.

(8) traversing this cache subspace and selecting a new cache unit for a known cache unit.

(9) setting a cache unit indexed with a cache subspace and addressed by a virtual index within this cache subspace to be unmapped.

(10) corresponding a storage unit indexed with a storage subspace and addressed by a virtual index within a storage subspace one-to-one with a cache unit indexed with a cache subspace and addressed by a virtual index within a cache subspace.

In order to better understand the technical solution of this application, the above functions and action sequences of the cache allocator and the cache executor will be explained in detail below.

The cache allocator 104 may receive configuration requests from the configuration interface at runtime, in a system state in which the other storage subspaces and cache subspaces are running, allocating the cache capacity for an empty cache subspace of the storage subspace that is to be run comprises the following steps:

calculating the cache execution configuration for this cache subspace based on the received cache request configuration for the cache subspace corresponding to this storage subspace.

traversing the other cache subspaces, after removing the cache units that have already been allocated to the other cache subspaces from all the cache units within the device, attempting to allocate the area of continuous blocks consisting of the remaining cache units to this cache subspace to satisfy the cache execution configuration according to the selection order and allocation method indicated by the configuration policy option.

upon the allocation successes,
    recording the area of continuous blocks allocated to this cache subspace in the index table for continuous blocks. The cache request configuration and the cache execution configuration are recorded in the structured configuration. Unless a new configuration request is received, this recorded allocation and configuration scheme remains unchanged for the lifetime of the storage subspace corresponding to this cache subspace.
    initializing all table entries of the mapping table of the storage subspace to be empty, initializing all table entries of the mapping table of the cache subspace to be empty, and initializing the structured state table of the cache subspace to be the initial state of the respective structured state machines.
    and feeding back that the configuration successes.
if the allocation is not successful,
    then feeding back that the configuration fails.

The cache allocator 104 may receive configuration requests from the configuration interface at runtime, in a system state in which the other storage subspaces and cache subspaces are running, increasing the cache capacity for an existing cache subspace corresponding to the running storage subspace comprises the following steps:

calculating a new cache execution configuration for this cache subspace based on the received configuration request for the cache subspace corresponding to this storage subspace.

notifying the cache executor to suspend all actions in the storage subspace and its corresponding cache subspace;

traversing all cache subspaces, after removing the cache units that have already been allocated to the other cache subspaces from all the cache units within the device, attempting to allocate the area of continuous blocks consisting of the remaining cache units to this cache subspace to satisfy the new cache execution configuration according to the selection order and allocation method indicated by the configuration policy option.

upon the allocation successes,
    recording the area of continuous blocks allocated to this cache subspace in the index table for continuous blocks.
    recording the cache request configuration and the cache execution configuration in the structured configuration.
    setting the table entries of the mapping tables of these newly allocated cache units within the cache subspace to be empty, and setting the contents of the structured state table of these units within the cache subspace to the initial state of the structured state machines.
    and feeding back that the configuration successes.
if the allocation is not successful,
    then feeding back that the configuration fails.

notifying the cache executor to resume all actions in the storage subspace and its corresponding cache subspace;

The cache allocator 104 may receive configuration requests from the configuration interface at runtime, in a system state in which the other storage subspaces and cache subspaces are running, decreasing the cache capacity for an existing cache subspace corresponding to the running storage subspace comprises the following steps:

calculating a new cache execution configuration for this cache subspace based on the received configuration request for the cache subspace corresponding to this storage subspace.

notifying the cache executor to suspend all actions in the storage subspace and its corresponding cache subspace;

notifying the cache executor to write the contents of all cache units within the cache subspace that are inconsistent with the contents of the corresponding storage units into the corresponding storage units;

traversing all cache units in the index table for continuous cache blocks of the cache subspace and attempting to reduce the number of owned units to satisfy this new cache execution configuration according to the selection order and allocation method indicated by the configuration policy option.

upon completion of the reduction, recording the changed areas of continuous blocks belonging to this cache subspace in the index table for continuous blocks.

recording the cache request configuration and the cache execution configuration in the structured configuration.

initializing all table entries of the mapping table of the storage subspace to be empty, initializing all table entries of the mapping table of the cache subspace to be empty, and initializing the structured state table of the cache subspace to be the initial state of the respective structured state machines.

and feeding back that the configuration successes.

notifying the cache executor to resume all actions in the storage subspace and its corresponding cache subspace;

The cache executor 103 receives and responds to a read request for a storage unit. In this request, this storage unit is addressed by combining the index of the storage subspace to which it belongs with its virtual index within the subspace. The cache executor 103 performs the following steps:

deriving the virtual index of its corresponding cache unit based on the subspace index, and the virtual index of this storage unit within this storage subspace. If the corresponding cache unit and its virtual index are found, then         checking the structured state of this cache unit, if the contents within the cache unit is valid, then:

updating this cache unit in the structured state table for units.

responding to the read request with the contents of this cache unit.

updating this cache unit in the structured state table for units again.

otherwise:

deriving the device index of this storage unit based on the subspace index, and the virtual index of this storage unit within this storage subspace.

deriving the device index of this cache unit based on the subspace index, and the virtual index of this cache unit within this cache subspace.

updating this cache unit in the structured state table for units.

reading out the contents of this storage unit and write them into this cache unit via the internal read/write interface 107. The two units are addressed with their device indexes.

responding to the read request with the contents of this cache unit.

updating this cache unit in the structured state table for units again.

if the corresponding cache unit and its virtual index are not found, then:

in the cache subspace corresponding to this storage subspace, traversing and selecting a cache unit for this storage unit and its read request.

corresponding this storage unit one-to-one with this cache unit.

deriving the device index of this storage unit based on the subspace index, and the virtual index of this storage unit within this storage subspace.

deriving the device index of this cache unit based on the subspace index, and the virtual index of this cache unit within this cache subspace.

updating this cache unit in the structured state table for units.

reading out the contents of this storage unit and write them into this cache unit via the internal read/write interface 107. The two units are addressed with their device indexes.

responding to the read request with the contents of this cache unit.

updating this cache unit in the structured state table for units again.

The cache executor 103 receives and responds to a write request for a storage unit. In this request, this storage unit is addressed by combining the index of the storage subspace to which it belongs with its virtual index within the subspace. The cache executor 103 performs the following steps:

deriving the virtual index of its corresponding cache unit based on the subspace index, and the virtual index of this storage unit within this storage subspace. If the corresponding cache unit and its virtual index are found, then:

checking the structured state of this cache unit, if the contents within the cache unit is valid, or the size of the write request is inconsistent with the size of the storage unit, then:

updating this cache unit in the structured state table for units.

responding to the write request with the contents of this cache unit.

updating this cache unit in the structured state table for units again.

if the contents of the cache unit are invalid and the size of the write request is inconsistent with the size of the storage unit, then:

deriving the device index of this storage unit based on the subspace index, and the virtual index of this storage unit within this storage subspace.

deriving the device index of this cache unit based on the subspace index, and the virtual index of this cache unit within this cache subspace.

updating this cache unit in the structured state table for units.

reading out the contents of this storage unit and write them into this cache unit via the internal read/write interface 107. The two units are addressed with their device indexes.

responding to the write request with the contents of this cache unit.
updating this cache unit in the structured state table for units again.
if the corresponding cache unit and its virtual index are not found, then:
in the cache subspace corresponding to this storage subspace, traversing and selecting a cache unit for this storage unit and its write request.
corresponding this storage unit one-to-one with this cache unit.
if the size of the write request is inconsistent with the size of the storage unit, then:
deriving the device index of this storage unit based on the subspace index, and the virtual index of this storage block within this storage subspace.
deriving the device index of this cache unit based on the subspace index, and the virtual index of this cache block within this cache subspace.
updating this cache unit in the structured state table for units.
reading out the contents of this storage unit and write them into this cache unit via the internal read/write interface 107. The two units are addressed with their device indexes.
responding to the write request with the contents of this cache unit.
updating this cache unit in the unit structured state table for units again.
otherwise:
updating this cache unit in the structured state table for units.
responding to the write request with the contents of this cache unit.
updating this cache unit in the structured state table for units again.

The cache executor 103 receives and responds to a request to write the contents of a cache unit into a corresponding storage unit. The cache unit is addressed by combining its index within the cache subspace with its virtual index within that cache subspace. The cache executor 103 performs the following steps:
looking up the virtual index of the storage unit corresponding to a cache unit according to the table entry of the cache unit in the mapping table for units of the cache subspace.
depending on the cache drop policy options for this cache subspace, and the structured state for this cache unit, choose to perform one of the following options:
option 1:
in this cache space, traversing and finding a new cache unit that is different from the corresponding one. If a new cache unit is successfully found, then:
setting this new cache unit to be unmapped.
deriving the device index of this storage unit based on the subspace index, and the virtual index of this storage unit within this storage subspace.
deriving the device index of this cache unit based on the subspace index, and the virtual index of this cache unit within this cache subspace.
deriving the device index of this new cache unit based on the subspace index, and the virtual index of this new cache unit within this cache subspace.
updating the cache unit and the new cache unit in the structured state table for units.
copying the contents of this cache unit to the new cache unit, both using their device indexes.
updating the cache unit and the new cache unit in the structured state table for units again.
writing the contents of this new cache unit into this storage unit via the internal read/write interface 107. The two units are addressed with their device indexes.
updating this cache unit and the new cache unit in the structured state table for units again.
otherwise:
performing option 2:
option 2:
deriving the device index of this storage unit based on the subspace index, and the virtual index of this storage unit within this storage subspace.
deriving the device index of this cache unit based on the subspace index, and the virtual index of this cache unit within this cache subspace.
updating this cache unit in the structured state table for units.
writing the contents of this new cache unit into this storage unit via the internal read/write interface 107. The two units are addressed with their device indexes.
updating this cache unit in the structured state table for units again.

The cache executor 103 derives the device index of a storage unit based on the storage subspace index of the storage unit, and its virtual index within this storage subspace, specifically including: calculating the virtual index of the storage block to which this storage unit belongs, by using the virtual index of this storage unit; looking up the virtual index table of this storage subspace, indexing with the value of the virtual index of this block, and obtaining the device index of this block from the value of the table entry; and calculating the device index of this storage unit, by using the device index of this storage block, and the relative index of this unit within the block.

The cache executor 103 derives the device index of a cache unit based on the storage subspace index of the cache unit, and its virtual index within this cache subspace, specifically including: calculating the virtual index of the cache block to which this cache unit belongs, by using the virtual index of this cache unit; looking up the virtual index table of this cache subspace, indexing with the value of the virtual index of this block, and obtaining the device index of this block from the value of the table entry; and calculating the device index of the cache unit, by using the device index of this cache block, and the relative index of this unit within the block.

The cache executor 103 derives the storage subspace to which a storage block belongs based on its device index, specifically including: looking up the index table for continuous blocks of all storage subspaces. If the device index of this storage block is found within the device index of continuous blocks described by one of the table entries from the table for the storage subspace, then the storage block belongs to the storage subspace. Otherwise, the storage block does not belong to any storage subspace.

The cache executor 103 derives the cache subspace to which a cache block belongs based on its device index, specifically including: looking up the index table for continuous blocks of all cache subspaces. If the device index of this cache block is found within the device index of continuous blocks described by one of the table entries from the table for the cache subspace, then the cache block belongs to the cache subspace. Otherwise, the cache block does not belong to any cache subspace.

The cache executor 103 derives the virtual index of a storage unit's corresponding cache unit based on the subspace index of the storage subspace to which the storage unit belongs, and the virtual index of the storage unit within the storage subspace, specifically including: the subspace index of this storage subspace is the subspace index of the corresponding cache subspace; looking up a table entry in the mapping table of this storage subspace by using this virtual index as the table index; and the virtual index of the cache unit contained in the table entry is the virtual index of the corresponding cache unit in the corresponding cache space.

The cache executor 103 derives the virtual index of a cache unit's corresponding storage unit based on the subspace index of the cache subspace to which the cache unit belongs, and the virtual index of the cache unit within the cache subspace, specifically including: the subspace index of this storage subspace is the corresponding subspace index of the corresponding cache subspace; looking up a table entry in the mapping table of this cache subspace by using this virtual index as the table index; and the virtual index of the storage unit contained in the table entry is the virtual index of the corresponding storage unit in the corresponding storage space.

The cache executor 103 traverses and selects a cache unit for reading or writing within the cache subspace corresponding to the storage subspace to which it belongs, for a storage unit. The cache executor 103 performs the following steps:
  (re-traverse return point) depending on the traversal policy option for this cache subspace, the cache execution capacity configurations for this cache subspace, the contents of the structured data for traverse history, and the virtual index of this storage unit, as well as the read and write types:
    selecting a traversal range. The traversal range is a set of cache units within this cache subspace.
    calculating the minimum cost threshold and the maximum cost threshold to determine the traversal end condition. The traversal end condition is one of the following:
      having found a cache unit whose cost function value is less than the minimum cost threshold.
      or having traversed all the cache units in the range and finding the cache unit among them that has the smallest cost function value and this cost function value is less than the maximum cost threshold.
    selecting a traversal order. The traversal order is to divide all the to-be-selected cache units within the traversal range into a plurality of pending windows. Each window has a plurality of to-be-selected cache units. The traversal order is the order in which these windows are traversed.
  for each traversal window, in the traversal order, before the traversal end condition is reached, perform the following step:
    reading the table entries corresponding to the to-be-selected units within this traversal window in the structured state table of the cache subspace. Based on the value of the structured state of each read cache unit, calculating the value of the cost function for each cache unit.
    and according to the traversal policy option, updating the structured state of the to-be-selected units to which this traversal window belongs and writing back to the corresponding table entries.
    recording the range of the windows that have been traversed into the structured data for traverse history.
  after the traversal completes, if a cache unit is found that satisfies the end condition, then:
    recording the cost function values of the cache units that satisfy the end condition into the structured data for traverse history.
  if no cache unit is found that satisfies the end condition, then:
    depending on the traversal policy options for this cache subspace, choose to perform one of the following two options:
      option 1: returning to the [re-traverse return point] and re-traversing.
      option 2: selecting the cache unit with the lowest cost function value. If the contents of the cache unit are inconsistent with the contents of the corresponding storage unit, the contents of the cache unit are written into the corresponding storage unit. After the writing completes, recalculate the value of the cost function of this cache unit. If the new cost function value is less than the maximum cost threshold, i.e., this cache unit satisfies the end condition then:
        recording the cost function values of the cache units that satisfy the end condition into the structured data for traverse history.
      if the cache unit does not satisfy the end condition, then:
        return to the [re-traverse return point] and re-traverse.
  using this cache unit that satisfies the end condition and is addressed by a virtual index as the selection result.

The cache executor 103 traverses this cache space and selects a new cache unit for a known cache unit in this cache space. The cache executor 103 performs the following steps:
  (re-traverse return point) depending on the traversal policy option for this cache subspace, the cache execution capacity configurations for this cache subspace, the contents of the structured data for traverse history, and the virtual index of this storage unit, as well as the read and write types:
    selecting a traversal range. The traversal range is a set of cache units within this cache subspace. And this set of cache units does not include this known cache unit.
    calculating the minimum cost threshold and the maximum cost threshold to determine the traversal end condition. The traversal end condition is one of the following:
      having found a cache unit whose cost function value is less than the cost threshold.
      or having traversed all the cache units in the range and finding the cache unit among them that has the smallest cost function value and this cost function value is less than the maximum cost threshold.
    selecting a traversal order. The traversal order is to divide all the to-be-selected cache units within the traversal range into a plurality of pending windows. Each window has a plurality of to-be-selected cache units. The traversal order is the order in which these windows are traversed.
  for each traversal window, in the traversal order, before the traversal end condition is reached, perform the following step:
    read the table entries corresponding to the to-be-selected units within this traversal window in the structured state table of the cache subspace. Based on the value of the structured state of each read cache unit, calculating the value of the cost function for each cache unit.

and according to the traversal policy option, updating the structured state of the to-be-selected units to which this traversal window belongs and writing back to the corresponding table entries.

recording the range of the windows that have been traversed into the structured data for traverse history.

after the traversal completes, if a cache unit is found that satisfies the end condition, then:

recording the cost function values of the cache units that satisfy the end condition into the structured data for traverse history.

if no cache unit is found that satisfies the end condition, then:

depending on the traversal policy options for this cache subspace, choose to perform one of the following two options:

option 1: returning to the [re-traverse return point] and re-traversing.

option 2: feeding back that the traversal and selection fails.

using this cache unit that satisfies the end condition and is addressed by a virtual index as the selection result.

The cache executor 103 sets a cache unit indexed with a cache subspace and addressed by a virtual index within this cache space to be unmapped, and the cache executor 103 performs the following steps:

in the structured state table of this cache subspace, updating the table entry corresponding to this cache unit to the initial state of the structured state machine.

within the mapping table of this cache subspace, in the table entries where the virtual index of this cache unit is the table index, reading out the virtual index of the storage unit in the contents of the table entry. In the mapping table of the storage subspace to which this storage unit belongs, setting the table entry whose index is the table index of this previous storage unit to be empty table entry.

setting this table entry to be empty table entry.

The cache executor 103 corresponds a storage unit indexed with a storage subspace and addressed by a virtual index within this storage subspace one-to-one with a cache unit indexed with a cache subspace and addressed by a virtual index within this cache subspace, and the cache executor 103 performs the following steps:

in the structured state table of this cache subspace, updating the table entry corresponding to this cache unit to the initial state of the structured state machine.

within the mapping table of this cache subspace, in the table entries where the virtual index of this cache unit is the table index, reading out the virtual index of the previous storage unit in the previous contents. In the mapping table of the storage subspace to which this previous storage unit belongs, setting the table entry whose index is the table index of this previous storage unit as a non-corresponding cache unit.

within the mapping table of this storage subspace, in table entries where the virtual index of this storage unit is the table index, updating the contents of the table entry to the virtual index of this cache unit.

within the mapping table of this cache subspace, in the table entries where the virtual index of this cache unit is the table index, updating the contents of the table entry to the virtual index of this storage unit.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

The sequence numbers used in describing the steps of the method do not in themselves constitute any limitation on the order of those steps. For example, it is not necessary that the step with the larger sequence number be performed after the step with the smaller sequence number, but it is also possible that the step with the larger sequence number be performed before the step with the smaller sequence number, and it is also possible that the steps be performed in parallel, as long as this order of performance is reasonable for a person skilled in the art. As another example, having a plurality of steps with consecutively numbered sequential numbers does not limit the number of other steps that can be executed between them.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. An SSD device with dynamic capacity cache acceleration, comprising:

a memory comprising multiple storage subspaces;

a cache comprising multiple cache subspaces, each corresponding one-to-one with the storage subspaces; and a controller comprising:
a cache allocator, configured to calculate a cache execution configuration for a storage subspace based on a cache configuration request for the storage subspace; and
a cache executor, configured to: select a traversal range and a traversal order, and calculate a minimum cost threshold and a maximum cost threshold, based on the cache execution configuration of a corresponding cache subspace of a storage subspace to which a storage unit belongs, a structured data for traverse history, and a virtual index of the storage unit, the traversal range comprising a set of cache units within the corresponding cache subspace, the set of cache units being divided into a plurality of pending windows; traverse the plurality of pending windows according to the traversal order, calculate a cost function of each cache unit in current pending window according to a structured state table of the corresponding cache subspace, and select a cache unit with its cost function less than the minimum cost threshold, or select a cache unit with the smallest cost function and less than the maximum cost threshold after traversing the plurality of pending windows; and update the structured state table corresponding to the cache unit within the current pending window, and record the values of the cost functions of the selected cache unit and the traversed pending windows into the structured data for traverse history.

2. The SSD device with dynamic capacity cache acceleration of claim 1, wherein the cache executor is further configured to: if no cache unit is selected after traversing the plurality of pending windows, select the cache unit with the smallest cost function, and if the content of the cache unit is inconsistent with the content of its corresponding storage unit, write the content of the cache unit into the corresponding storage unit, recalculate the cost function of the cache unit, and record the cost function value of the cache unit into the structured data for traverse history if the cost function is less than the maximum cost threshold.

3. The SSD device with dynamic capacity cache acceleration of claim 1, further comprises a metadata memory which stores:
structured metadata for the storage subspaces used to record metadata of each storage subspace, wherein each storage subspace comprises a plurality of areas of continuous storage blocks, each area of continuous storage blocks comprises a plurality of storage blocks with continuous device indexes, each storage block comprises a plurality of storage units, and each storage subspace has a corresponding virtual index space, wherein the metadata of each storage subspace comprises an index table for the continuous storage blocks, an virtual index table for the storage blocks, and a mapping table for the storage units; and
structured metadata for the cache subspaces used to record metadata of each cache subspace, wherein each cache subspace comprises a plurality of areas of continuous cache blocks, each area of continuous cache blocks comprises a plurality of cache blocks with continuous device indexes, each cache block comprises a plurality of cache units, and each storage subspace has a corresponding virtual index space, wherein the metadata of each cache subspace comprises an index table for continuous cache blocks, an virtual index table for the cache blocks, a mapping table for the cache units, a structured state table for the cache units, a structured configuration, and structured data for traverse history, the structured configuration comprises a cache request configuration and a cache execution configuration, the cache request configuration comprises a cache capacity and a cache policy option, the cache execution configuration comprises a cache execution capacity configuration and a cache execution policy option, the cache execution capacity configuration comprises a minimum cache capacity, a necessary cache capacity, a read peak cache capacity, and a write peak cache capacity, the cache execution policy option comprise a configuration policy option, a traversal policy option and a drop policy option.

4. The SSD device with dynamic capacity cache acceleration of claim 3, wherein the cache allocator is further configured to:
after calculating the cache execution configuration for the cache request configuration for a cache subspace corresponding to a storage subspace to be run and completing the configuration,
traverse other cache subspaces, and group unallocated cache units into an area of continuous cache blocks and allocate it to a cache subspace based on the configuration policy option; and
record the area of continuous cache blocks in the index table for continuous cache blocks, record the cache request configuration and the cache execution configuration in the structured configuration, initialize all table entries of the mapping table for the storage units of the storage subspace to be empty, initialize all table entries of the mapping table for the cache units of the cache subspace to be empty, and initialize the structured state table for the cache units of the cache subspace to be the initial state of structured state machines of respective units.

5. The SSD device with dynamic capacity cache acceleration of claim 3, wherein the cache allocator is further configured to:
after calculating the cache execution configuration for the cache request configuration for a cache subspace corresponding to a storage subspace that is running and completing the configuration,
notify the cache executor to suspend all actions in the storage subspace and its corresponding cache subspace;
traverse other cache subspaces, and group unallocated cache units into an area of continuous cache blocks and allocate it to a cache subspace based on the configuration policy option;
record the area of continuous cache blocks in the index table for continuous cache blocks, record the cache request configuration and the cache execution configuration in the structured configuration, initialize all table entries of the mapping table for the cache units of the cache subspace to which a newly allocated cache unit belongs to be empty, and initialize the structured state table for the cache units of the cache subspace to which the newly allocated cache unit belongs to be the initial state of the structured state machines of respective units; and
notify the cache executor to resume all actions in the storage subspace and its corresponding cache subspace.

6. The SSD device with dynamic capacity cache acceleration of claim 3, wherein the cache allocator is further configured to:
after calculating the cache execution configuration for the cache request configuration for a cache subspace corresponding to a storage subspace that is running and completing the configuration, notify the cache executor to suspend all actions in the storage subspace and its corresponding cache subspace;

notify the cache executor to write the contents of all cache units within the corresponding cache subspace, which are inconsistent with the contents of the corresponding storage units, into the corresponding storage units;

traverse all cache units in the index table for continuous cache blocks for the cache subspace, reduce several cache units according to the configuration policy option;

record the areas of continuous cache blocks that belong to the cache subspace after reduction in the index table for continuous cache blocks, record the cache request configuration and the cache execution configuration in the structured configuration, initialize all table entries of the mapping table for the storage units of the storage subspace to be empty, initialize all table entries of the mapping table for the cache units of the cache subspace to be empty, and initialize the structured state table for the cache units of the cache subspace to be the initial state of the structured state machines of respective units; and notify the cache executor to resume all actions in the storage subspace and its corresponding cache subspace.

7. The SSD device with dynamic capacity cache acceleration of claim 3, wherein the cache executor is further configured to:

in response to a read request to a storage unit, calculate a virtual index of a cache unit corresponding to the storage unit based on a subspace index of a storage subspace to which the storage unit belongs and a virtual index of the storage unit in the storage subspace;

if the corresponding cache unit is found, check the structured state of the cache unit, and if the contents of the cache unit are valid, update the contents of the cache unit in the structured state table, respond to the read request with the contents of the cache unit and update the contents of the cache unit in the structured state table again; if the contents of the cache unit are invalid, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the storage unit into the cache unit, respond to the read request with the contents of the cache unit, and update the contents of the cache unit in the structured state table again; and if the corresponding cache unit is not found, traverse and select a cache unit in the cache subspace corresponding to the storage subspace to which the storage unit belongs, correspond the storage unit one-to-one with the cache unit, calculate the device index of the storage unit based on the subspace index of the storage subspace to which the storage unit belongs and the virtual index of the storage unit in the storage subspace, calculate the device index of the cache unit based on the subspace index of the cache unit and the virtual index of the cache unit in the storage subspace, update the contents of the cache unit in the structured state table, write the contents of the cache unit into the cache unit, and update the contents of the cache unit in the structured state table, write the contents of the storage unit into the cache unit, respond to the read request with the contents of the cache unit, and update the contents of the cache unit in the structured state table again.

8. The SSD device with dynamic capacity cache acceleration of claim 3, wherein the cache executor is further configured to:

in response to a write request to a storage unit, calculate a virtual index of a cache unit corresponding to the storage unit based on a subspace index of a storage subspace to which the storage unit belongs and a virtual index of the storage unit in the storage subspace;

if the corresponding cache unit is found, check the structured state of the cache unit, and if the contents of the cache unit are valid and the size of the write request is consistent with the size of the storage unit, update the contents of the cache unit in the structured state table, respond to the write request with the contents of the cache unit, and update the contents of the cache unit in the structured state table again; if the contents of the cache unit are invalid and the size of the write request is inconsistent with the size of the storage unit, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the storage unit into the cache unit, respond to the write request with the contents of the cache unit, and update the contents of the cache unit in the structured state table again; and if the corresponding cache unit is not found, traverse and select a cache unit in the cache subspace corresponding to the storage subspace to which the storage unit belongs, correspond the storage unit one-to-one with the cache unit, if the size of the write request is inconsistent with the size of the storage unit, calculate the device index of the storage unit based on the subspace index of the storage subspace to which the storage unit belongs and the virtual index of the storage unit in the storage subspace, calculate the device index of the cache unit based on the subspace index of the cache unit and the virtual index of the cache unit in the cache subspace, update the contents of the cache unit in the structured state table, respond to the read request with the contents of the cache unit, and update the contents of the cache unit in the structured state table again; if the size of the write request is consistent with the size of the storage unit, update the contents of the cache unit in the structured state table, update the contents of the cache unit in the structured state table, respond to the write request with the contents of the cache unit, and update the contents of the cache unit in the structured state table again.

9. The SSD device with dynamic capacity cache acceleration of claim 3, wherein the cache executor is further configured to:

in response to a request to write a cache unit into a corresponding storage unit, calculate a virtual index of a storage unit corresponding to the cache unit based on the subspace index of a cache subspace to which the cache unit belongs and a virtual index of the cache unit in the cache subspace;

traverse within the cache subspace based on the cache drop policy option of the cache subspace and the structured state of the cache unit, if a new cache unit different from the cache unit is found, set the new cache unit to be unmapped, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit and the new cache unit in the structured state table, write the contents of the cache unit into the new cache unit, update the contents of the cache unit and the new cache unit in the structured state table again, write the contents of the new cache unit into the storage unit, and update the contents of the cache unit and the new cache unit in the structured state table again; and if the corresponding cache unit is not found, calculate the device index of the storage unit based on the subspace index of the storage subspace to which the storage unit belongs and the virtual index of the storage unit in the storage subspace, calculate the device index of the cache unit based on the subspace index of the cache subspace to which the cache unit belongs and the virtual index of the cache unit in the cache subspace, update the contents of the cache unit in the structured state table, write the contents of the cache unit into the storage unit, and update the contents of the cache unit in the structured state table again.

10. The SSD device with dynamic capacity cache acceleration of claim 1, further comprising:

a cache configuration interface configured to receive an external cache configuration request including a cache capacity and a cache adjustment policy option;

an external read/write interface configured to respond to external read/write requests, read out all or part of the content of the corresponding storage unit or writing all or part of the content received by the external read/write interface into the corresponding storage unit; and an internal read/write interface configured to implement read and write between the cache units and the storage units.

* * * * *